United States Patent
Bordage et al.

(10) Patent No.: US 12,038,268 B2
(45) Date of Patent: Jul. 16, 2024

(54) METHOD OF DETECTING COATING WEAR

(71) Applicant: Hamilton Sundstrand Corporation, Charlotte, NC (US)

(72) Inventors: Kevin R. Bordage, Westfield, MA (US); Katherine Urena Pimentel, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 203 days.

(21) Appl. No.: 17/592,822

(22) Filed: Feb. 4, 2022

(65) Prior Publication Data

US 2023/0204343 A1 Jun. 29, 2023

Related U.S. Application Data

(60) Provisional application No. 63/293,925, filed on Dec. 27, 2021.

(51) Int. Cl.
*G01B 11/06* (2006.01)
*G01N 21/84* (2006.01)

(52) U.S. Cl.
CPC ..... *G01B 11/0625* (2013.01); *G01N 21/8422* (2013.01); *G01N 2021/8427* (2013.01)

(58) Field of Classification Search
CPC ....... G01B 11/0625; G01N 2021/8427; G01N 21/8422; G01N 21/64; G01N 2223/076
See application file for complete search history.

(56) References Cited

U.S. PATENT DOCUMENTS

| | | |
|---|---|---|
| 6,861,154 B2 | 3/2005 | Olson et al. |
| 6,864,489 B2 | 3/2005 | Chen et al. |
| 2003/0081203 A1 | 5/2003 | Chen et al. |
| 2013/0057849 A1 | 3/2013 | Yeh |
| 2014/0322533 A1 * | 10/2014 | Kimura ................. H01B 3/301 428/383 |
| 2021/0404959 A1 * | 12/2021 | Poteet .................. G01N 21/643 |

FOREIGN PATENT DOCUMENTS

| | | | | |
|---|---|---|---|---|
| CN | 114921981 A | * | 8/2022 | |
| DE | 102019216245 B3 | * | 11/2020 | ............. G01N 21/55 |
| EP | 3809119 A1 | | 4/2021 | |
| FR | 2836229 A1 | * | 8/2003 | ............. C23C 24/04 |
| FR | 2836229 A1 | | 8/2003 | |
| FR | 3082669 A1 | * | 12/2019 | ........... H01R 4/4818 |
| WO | WO-0016025 A1 | * | 3/2000 | ......... B05B 11/0005 |
| WO | 2015/146939 A1 | | 10/2015 | |

OTHER PUBLICATIONS

Walter Carter, "Fluorescent Fluid Dynamics UV Dye Vortex", https://www.youtube.com/watch?v=UbJ_b1ZLAp0 2017 (Year: 2017).*
European Search Report for EP Application No. 22211195.7 dated May 15, 2023.

* cited by examiner

*Primary Examiner* — Maurice C Smith
(74) *Attorney, Agent, or Firm* — Carlson, Gaskey & Olds, P.C.

(57) ABSTRACT

A method of inspecting a component includes the steps of identifying a component having an outer surface of a first hardness, and mounted with a holding member of a second hardness which is greater than the first hardness. A protective coating is provided about the first component, and the protective coating having a dye which absorbs a particular range of electromagnetic wavelengths. The amount of the dye remaining in the coating is inspected to identify an amount of wear of the coating.

20 Claims, 2 Drawing Sheets

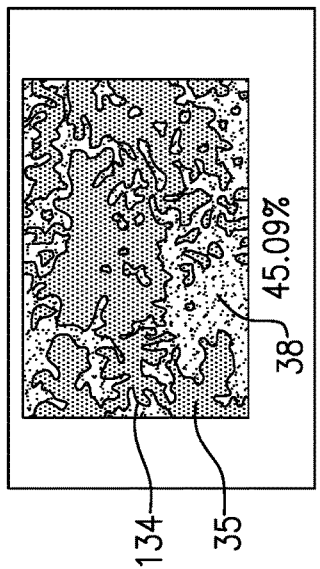
FIG.3A
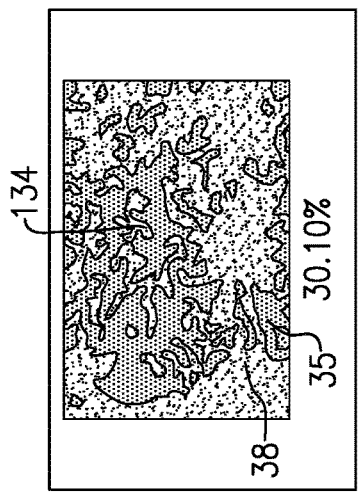
FIG.3B
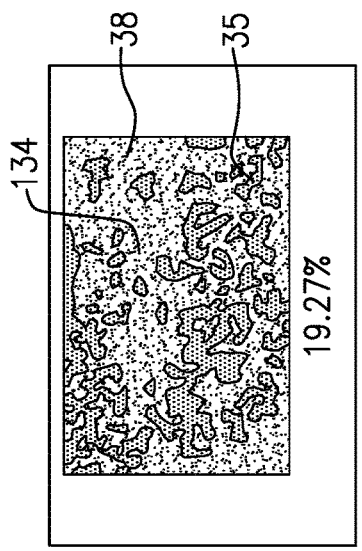
FIG.3C
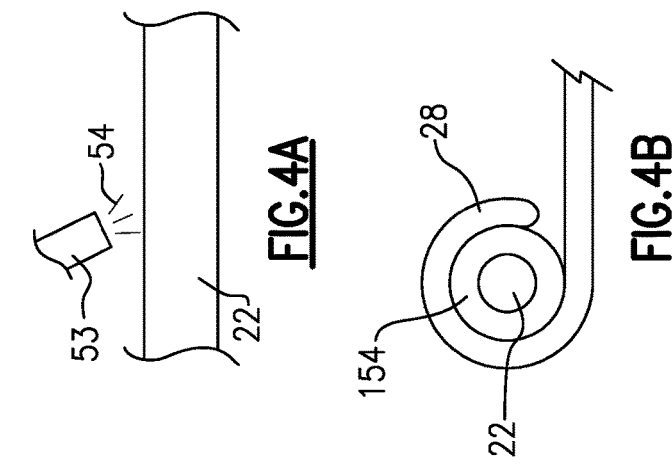
FIG.4A
FIG.4B
FIG.5
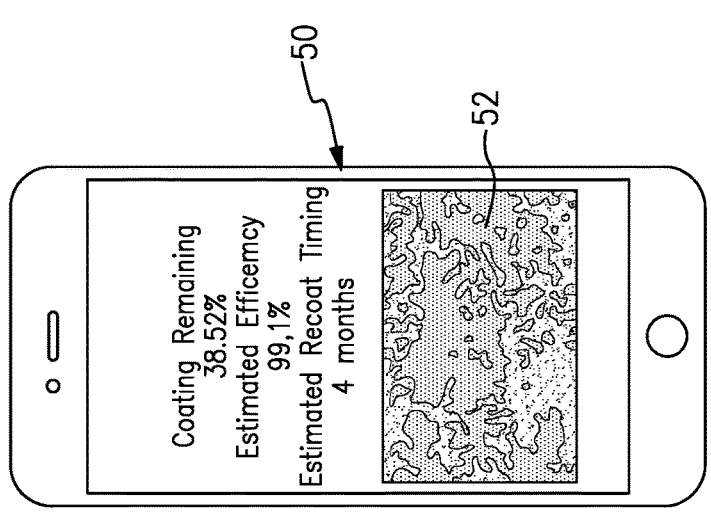
FIG.3D

METHOD OF DETECTING COATING WEAR

CROSS-REFERENCE TO RELATED APPLICATION

This application claims priority to U.S. Provisional Patent Application No. 63/293,925 filed on Dec. 27, 2021.

BACKGROUND OF THE INVENTION

This application relates to a method of detecting wear in a coating such as found on electrical harnesses.

Modern systems incorporate a number of electrical systems. Typically electrical wires are routed between components, and are held in place such as by clips. In many applications these clips are formed of a metal whereas the electrical harnesses have a non-metallic sheathing.

Coatings are often placed on the outside of the sheathing to protect the sheathing from undue wear. However, and in particular, when the system is subject to a vibration there can be undue wear as the metallic clips are harder than the non-metallic sheathing.

Of course, undue wear on the sheathing would be undesirable.

SUMMARY OF THE INVENTION

A method of inspecting a component includes the steps of identifying a component having an outer surface of a first hardness, and mounted with a holding member of a second hardness which is greater than the first hardness. A protective coating is provided about the first component, and the protective coating having a dye which absorbs a particular range of electromagnetic wavelengths. The amount of the dye remaining in the coating is inspected to identify an amount of wear of the coating.

These and other features of this disclosure can be best understood from the following specification and drawings, the following of which is a brief description.

BRIEF DESCRIPTION OF THE DRAWINGS

FIG. 3A shows an image of a sheathing having its coating relatively intact.

FIG. 3B shows an image of a sheathing with a medium amount of wear.

FIG. 3C shows an image of a sheathing with even further wear.

FIG. 3D is an example display for a method according to this disclosure.

FIG. 4A shows a first corrective step.

FIG. 4B shows a second corrective step including a design modification.

FIG. 5 shows an alternative inspection method.

DETAILED DESCRIPTION

Figure 1A:
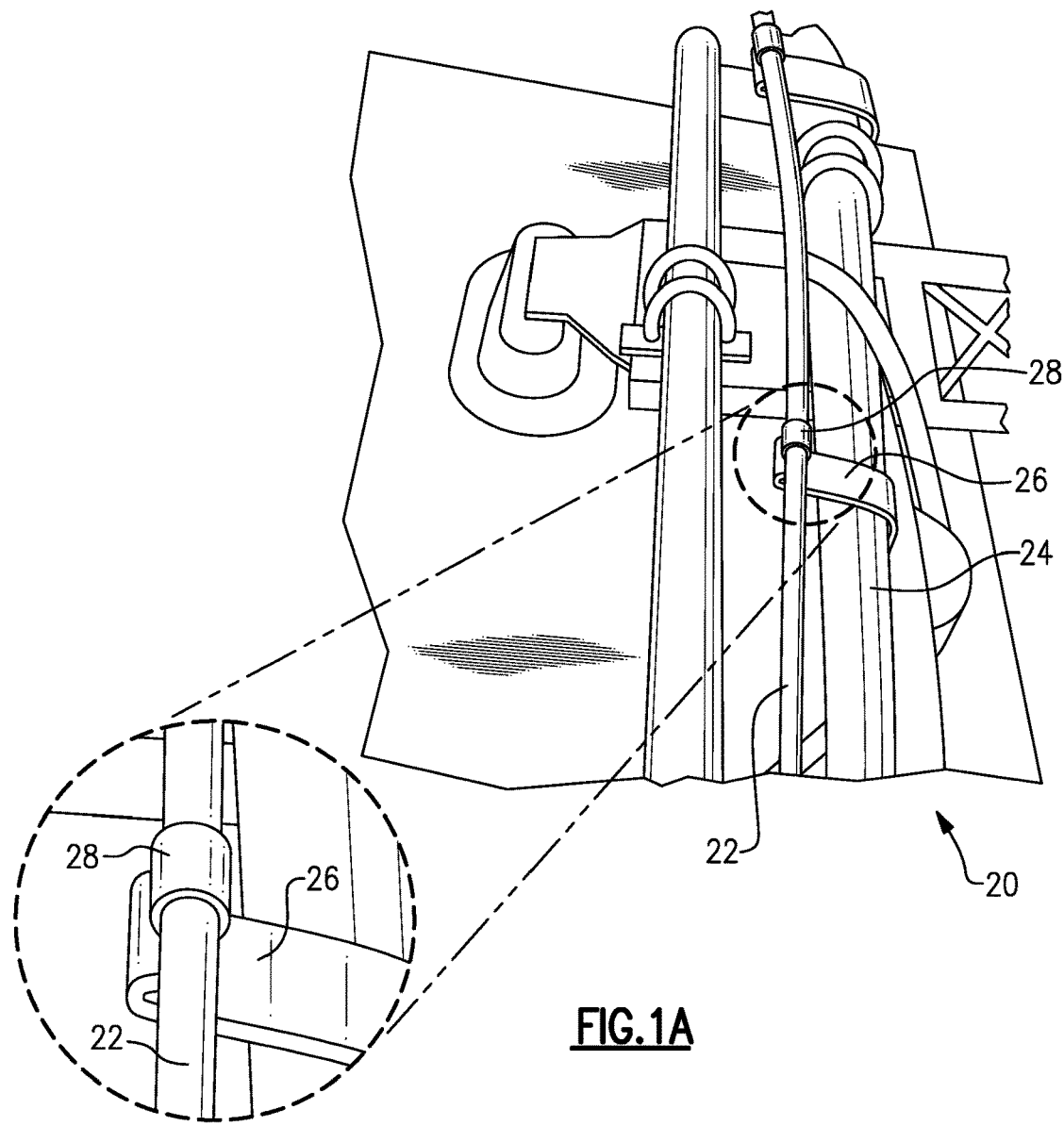
FIG. 1A shows an example system.

FIG. 1A shows a system 20 such as may be found in any number of industrial applications. In one specific application system 20 is mounted upon an aircraft which is a subject to a good deal of vibration.

An electrical harness 22 is secured to a metal conduit 24 through a metal clip 26 having a loop 28 surrounding the harness 22. This detail of the harness 22, clip 26 and loop 28 are shown enlarged in the exploded portion of FIG. 1A.

Figure 1B:
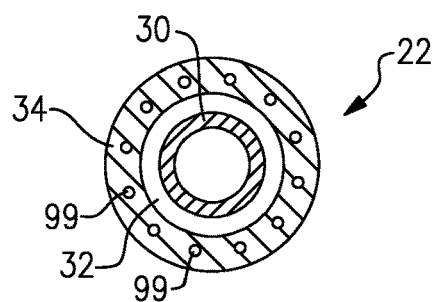
FIG. 1B is a cross-section through an electrical harness as part of the system of FIG. 1.

FIG. 1B is a cross-section through an example electrical harness 22. A central electric wire 30 is surrounded by the sheathing 32. Further, a protective coating 34 is placed outwardly of the sheathing 32. The thickness of the coating 34 is exaggerated to illustrate the fact of the sheathing.

In a method according to this invention, a dye 99 is shown included in the coating material. In practice the dye will be uniformly distributed through coating 34.

In one example, the dye might be ultraviolet inspectable dyes which absorb light over a specific range of the ultraviolet wavelength.

On the other hand, other dyes which absorb light over the infrared band may be utilized.

One example would be silane-functionalized quaternary ammonium compounds. With such dyes incorporated into the coating, one may monitor the condition of the coating by applying UV light to the electrical harness, and evaluating the amount of coating which appears to be left.

An additional benefit of the silane-functionalized quaternary ammonium compounds is that it also protects the underlying substrate from bacterial or fungal growth which will facilitate the ability to pass stringent aerospace fungus resistant requirements. The dye and coating may be solvent-based or may be water-based.

In one embodiment, the inspection method may include a black light to be applied on the electrical harness 22. This may be done while the harness is still in place on the aircraft.

Figure 2:
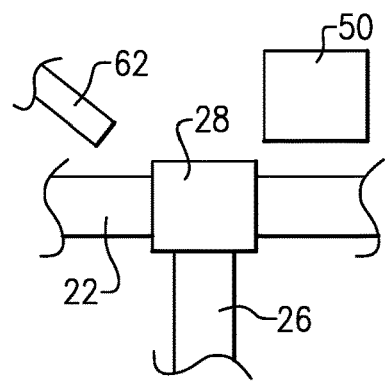
FIG. 2 shows a first inspection method.

FIG. 2 shows a first inspection method. A black light 62 is applied to the electrical harness 22 which causes the dye to become visible. A smartphone 50 photographs the amount of dye visible at that point.

The dye may be fluorescent and capable of absorbing in the UV spectrum and would emit in the visible spectrum. The compound may absorb radiation in the range of 100-415 nm wavelengths, and more preferably in the range of 365-415 nm wavelengths and emit radiation in the 100-1000 nm wavelength, but most preferably emit visible light in the 380-740 nm wavelength.

The fluorescent dyes are preferably transparent in the presence of visual light and uncolored so as not to alter the color and/or transparency of the nominal coating 34 or the surface of the substrate, here sheathing 32. The dye may be a fluorescent dye, a pigment, a colorant, or a brightener as long as it meets the wavelength requirement to allow a method of inspection.

As an example, FIG. 3A shows a photo of a portion 35 of harness 22, which may be taken such as by smartphone 50. Areas 134 are shown as one color whereas areas 38 are shown as another. Areas 134 are the remainder of the coating, and the amount of areas 38 show wear, or lack of the coating.

FIG. 3B shows another photo wherein there is additional wear and more of the worn area 38 compared to FIG. 3A.

FIG. 3C shows yet a further photo wherein there is even more wear 38, and the wear 38 is becoming even more intense. FIG. 3C may be indicative of a need to recoat the electrical harness.

FIG. 3D shows smartphone 50 having the photo 52. The smartphone 50 is programmed to evaluate the percentage of wear of the coating in the particular photo. Known software programs capable of determining the relative percentage of two areas in an image may be utilized to determine the relative percentage of area 134 and 38.

Now, in a method according to this invention, a light sensitive dye is included into a coating which is placed upon a conduit such as an electrical harness. While an electrical harness is specifically disclosed, the teaching of this disclosure could also apply to other components which are held in place by clips or other holding members which are harder than the component itself such that there could be undue wear. As one example, there may be fluid conduits that would benefit from this disclosure.

The inspecting step may include a step of photographing a portion of the component.

A device is utilized to take the photograph, and the photograph then being evaluated with a program capable of identifying a percentage of remaining coating on the component. The device is a smartphone.

FIG. 4A shows a first corrective step in which a coating tool 53 is applying coating 54 to the harness 22. The harness 22 would preferably be removed from the clip prior to performing this coating. The coating would be performed as a result of the inspection as previously described.

The quality of the coating is periodically inspected, such as looking for the ultraviolet light response. As mentioned above, the use of infrared sensitive dyes would also come within the scope of this disclosure.

FIG. 4B shows an alternative corrective step. If undue wear is identified on the electrical harness 22 at a particular location with regard to a clip 26 and its loop 28, a designer may include a protective grommet 154 which is of a material similar to the material of the sheathing surrounding the harness 22. Now, should there be undue wear due to vibration it would occur to the grommet, and not likely damage the harness 22.

FIG. 5 shows such a method wherein a user 60 wears goggles 100 useful for seeing the dye. That is the smartphone need not be used, and the inspection is visual. A black light 62 again applies light to allow the inspection. The method would otherwise be similar to the specifically disclosed method above.

A method of inspecting a component under this disclosure could be said to include the steps of identifying a component having an outer surface of a first hardness, and mounted with a holding member of a second hardness which is greater than the first hardness. A protective coating provided about the first component, and the protective coating having a dye which absorbs a particular range of electromagnetic wavelengths. The amount of the dye remaining in the coating is inspected to identify an amount of wear of the coating.

Although embodiments have been disclosed, a worker of skill in this art would understand that modifications would come within the scope of this disclosure. For that reason the following claims should be studied to determine the true scope and content.

What is claimed is:

1. A method of inspecting a component comprising the steps of:
    identifying a component having an outer surface of a first hardness, and mounted with a holding member of a second hardness which is greater than the first hardness;
    providing a protective coating about the first component, and the protective coating having a dye which absorbs a particular range of electromagnetic wavelengths;
    inspecting the amount of the dye remaining in the coating to identify an amount of wear of the coating; and
    wherein if undue wear on the coating is identified a need to recoat the first component is determined.

2. The method as set forth in claim 1, wherein the dye is a silane-functionalized quaternary ammonium compound.

3. The method as set forth in claim 1, wherein goggles are worn in the inspecting step which allow a wearer to identify the quality of the coating.

4. The method as set forth in claim 1, wherein the inspecting step includes a step of photographing a portion of the component.

5. The method as set forth in claim 1, wherein the dye absorbs light in a range of 100-415 nm wavelengths.

6. The method as set forth in claim 1, wherein the first component is a conduit and a second component is a clip for holding the conduit.

7. The method as set forth in claim 6, wherein if undue wear is determined at a particular location a grommet may be placed between the conduit and the clip to protect the conduit.

8. The method as set forth in claim 6, wherein the conduit is an electrical harness having an outer sheathing which is non-metallic.

9. The method as set forth in claim 8, wherein the clip is metallic.

10. The method as set forth in claim 9, wherein the dye absorbs light in a range of 100-415 nm wavelengths.

11. The method as set forth in claim 10, wherein the dye absorbs light in a range of 365-415 nm wavelengths.

12. The method as set forth in claim 9, wherein a black light is applied to the conduit as part of the inspecting step.

13. The method as set forth in claim 12, wherein a coating is applied to the component after the need to recoat is identified.

14. The method as set forth in claim 9, wherein the dye has at least one of antibacterial and antifungal growth properties.

15. A method of inspecting a component comprising the steps of:
    identifying a component having an outer surface of a first hardness, and mounted with a holding member of a second hardness which is greater than the first hardness;
    providing a protective coating about the first component, and the protective coating having a dye which absorbs a particular range of electromagnetic wavelengths;
    inspecting the amount of the dye remaining in the coating to identify an amount of wear of the coating; and
    wherein the dye has at least one of antibacterial and antifungal growth properties.

16. The method as set forth in claim 15, wherein if undue wear on the coating is identified a need to recoat the first component is determined.

17. The method as set forth in claim 16, wherein a coating is applied to the component after the need to recoat is identified.

18. A method of inspecting a component comprising the steps of:
    identifying a component having an outer surface of a first hardness, and mounted with a holding member of a second hardness which is greater than the first hardness;
    providing a protective coating about the first component, and the protective coating having a dye which absorbs a particular range of electromagnetic wavelengths;
    inspecting the amount of the dye remaining in the coating to identify an amount of wear of the coating;
    wherein the inspecting step includes a step of photographing a portion of the component; and wherein a device is utilized to take the photograph, and the photograph then being evaluated with a program capable of identifying a percentage of remaining coating on the component.

19. The method as set forth in claim 18, wherein if undue wear on the coating is identified a need to recoat the first component is determined.

20. The method as set forth in claim 18, wherein the device is a smartphone.

* * * * *